United States Patent

Eadie et al.

[11] Patent Number: 5,836,267
[45] Date of Patent: Nov. 17, 1998

[54] ANTI-PECKING DEVICE

[75] Inventors: Brian Kenneth MacGregor Eadie; Peter Scott Eadie, both of Renfrewshire, United Kingdom

[73] Assignee: Martin Edgar, Selkirk, United Kingdom

[21] Appl. No.: 765,799

[22] PCT Filed: Jul. 17, 1995

[86] PCT No.: PCT/GB95/01684

§ 371 Date: Apr. 25, 1997

§ 102(e) Date: Apr. 25, 1997

[87] PCT Pub. No.: WO96/02131

PCT Pub. Date: Jul. 17, 1995

[30] Foreign Application Priority Data

Jul. 15, 1994 [GB] United Kingdom ............ 9414389

[51] Int. Cl.$^6$ .................................................. A01K 45/00
[52] U.S. Cl. ............................................................ 119/715
[58] Field of Search ............................... 119/713, 715

[56] References Cited

U.S. PATENT DOCUMENTS

| 546,905 | 9/1895 | Schild ........................... 119/715 |
|---|---|---|
| 2,445,867 | 7/1948 | Wolfson et al. ................ 119/715 |
| 2,573,942 | 11/1951 | Wolfson et al. ................ 119/715 |
| 3,446,187 | 5/1969 | Harwood et al. .............. 119/715 |

*Primary Examiner*—Thomas Price
*Attorney, Agent, or Firm*—Ratner & Prestia

[57] ABSTRACT

Improved anti-pecking devices, particularly for poultry and game birds, comprise a pair of limbs having end portions of reduced cross section which engage the nostrils of the bird or other animal, at least one bit member connecting the limbs, and a guard member which projects forwardly from the limbs beyond the end of the beak of the bird. The forward end of the guard may be split. The device may further include resilient bias members which bear upon the upper surface of the beak, in use. Other variations include guard members which extend laterally outwards from the sides of the limbs and multiple bit members spaced apart along the length of the device. The size and configuration of the device and its constituent parts may be varied to suit different sizes and species of bird. The devices are configured to be stackable, such that they may be stored in a cartridge or magazine for application using an automated fitting device.

17 Claims, 3 Drawing Sheets

ANTI-PECKING DEVICE

This invention relates to an anti-pecking device.

Animals, for example young birds, kept in captivity have a tendency to exhibit violent behaviour towards each other and many often kill each other.

It is clearly desirable to prevent animals from harming each other and several well known methods and devices (henceforth called anti-pecking devices) have been used.

Known methods of prevention include de-beaking or beak trimming of birds and previously known anti-pecking devices include fitted beak guards and beak covers, and also beak bits which prevent beaks from fully closing.

De-beaking is painful, unnatural and may adversely affect the birds. Various degrees of beak-trimming are now being legislated against after proof of trauma, especially to older birds. Although often carried out on very young poultry, beak trimming is also performed at laying age and it is carried out on mature game birds either pre-release in "wild" systems, or upon release to larger outdoor communities. The de-beaking and beak trimming procedures often have a temporary effect, and must be repeated at intervals to maintain their effectiveness.

Known fitted anti-pecking devices impose various degrees of pain on the birds to which they are fitted, depending on the type of product and method of fixing. Pin fixed devices, which involve location of the device via a single pin passed through the nasal septum, cause pain to the birds and are now legislated against. Beak bits which hold the mandibles apart, are often used on younger growing birds, but are effective for a limited period only. Larger sizes must be subsequently fitted to maintain the effectiveness of such devices, and this is time consuming, costly and stressful if birds are kept for any significant length of time in captivity.

Clip-on devices are unreliable in that they are difficult to fit securely to the birds and may be removed by the birds themselves.

It is therefore desirable to produce an anti-pecking device as effective as some of the prior art devices but with a greatly reduced level of cruelty to the bird to which the device is to be applied.

According to the present invention there is provided an anti-pecking device for fitting to an animal, comprising first and second limb members each having an end portion adapted to be located in a nostril of the animal, at least one bit member coupled to at least one of said limb members and adapted to be positioned between the jaws or mandibles of the animal and at least one guard member coupled to at least one of said limb members adapted to extend outwardly from the jaws or mandible of the animal.

In the preferred embodiments of the invention, said at least one guard member extends forwardly of the jaws or mandible of the animal.

In alternative embodiments, at least first and second guard members extend laterally on either side of the jaws or mandible of the animal.

Preferably, the end portions of said limb members, which are adapted to be located in the nostrils of the animal, are spaced apart from each other.

Preferably, the device is configured so that said end portions may be resiliently forced away from each other, increasing the distance by which they are spaced apart.

Preferably, said limb members are formed from a resilient material.

Preferably, one or both of the bit member and guard member connect the first and second limb members.

Preferably, there is provided bias means to bias the bit member against the upper jaw or mandible of the animal. Such bias means helps to stabilise the location the device with respect to the jaw or mandible of the animal.

Preferably, said bias means comprises at least one bias member adapted to press down upon an upper surface of the upper jaw or mandible of the animal.

Preferably, at least one of the first and second limb members is provided with at least one bias member.

Preferably, both the first and second limb members are provided with a bias member.

The device may be configured such that the bit member provides the only connection between the first and second limb members, and said bit member may be adapted to break at some point during use, such that the device is, in effect, removed from the animal automatically.

Preferably, the device is configured so that a plurality of such devices may be nested or stacked upon one another.

Preferably, said limb members, bit member and at least one guard member all extend in substantially a single is plane.

Preferably, said device is substantially planar.

Preferably, said device is formed from a single piece of a plastics material.

Embodiments of the present invention will now be described with reference to the accompanying drawings in which.

Figure 1:
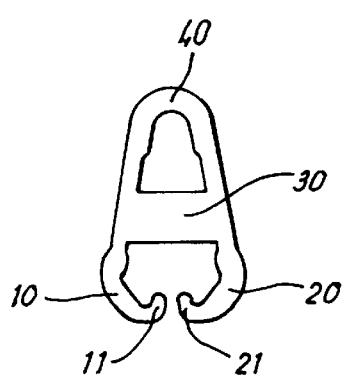
FIGS. 1 and 2 are plan views of variations of a first embodiment of the present invention.

Referring to the drawings (in which corresponding elements are designated by corresponding reference numerals) an anti-pecking device comprises a plastic moulding having a pair of limb members 10, 20 each having an end portion 11, 21 of smaller cross sectional area than the main part of the limb portion 10, 20, adapted to be located in a nostril of an animal to which the device is to be fitted. The end portions 11, 21 are spaced apart from each other and the device provides sufficient resilience for this spacing to be temporarily increased so that the device may be fitted to an animal. Such a device also includes at least one bit member 30 adapted to fit between the jaws or mandibles of said animal, and at least one guard member 40 adapted to extend outwardly from the jaws or mandibles of said animal. In the preferred embodiments of the invention, the guard member 40 extends forwardly of the jaws or mandibles of the animal.

Figure 2:
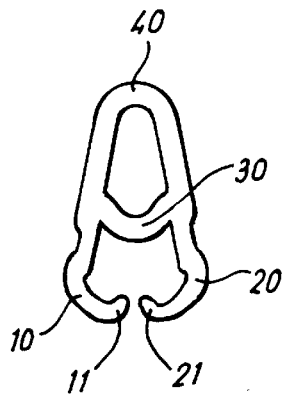

FIGS. 1 and 2 illustrate variations of a first embodiment in which the limb members are coupled together by both the bit member 30 and the guard member 40.

Figure 3:
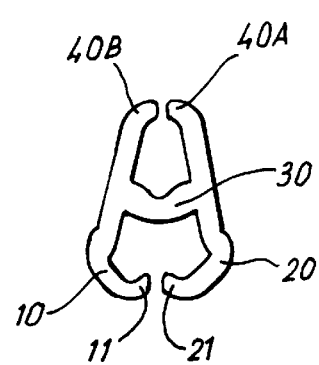
FIG. 3 is a plan view of a second embodiment.

FIG. 3 illustrates a second embodiment in which the guard member is not continuous but is split at its forward end and consists of a pair of members 40A, 40B having their forward ends slightly spaced apart (alternatively the ends of these members may be in contact but not directly attached to each other). In this embodiment therefore the limb members 10, 20 are coupled together only by the bit member 30.

Figure 4:
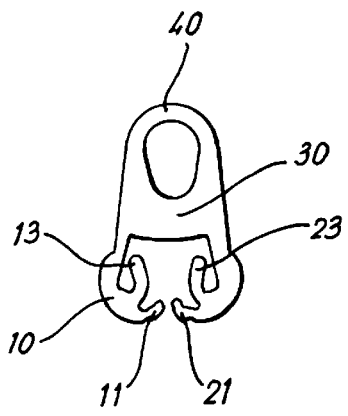
FIGS. 4, 5 and 6 are plan views of variations of a third embodiment.
Figure 5:
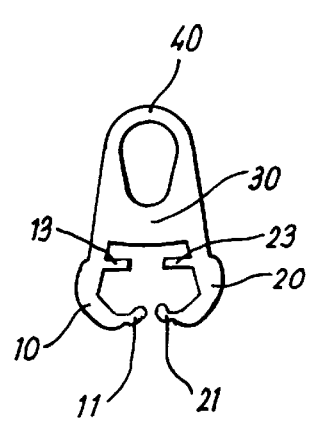
Figure 6:
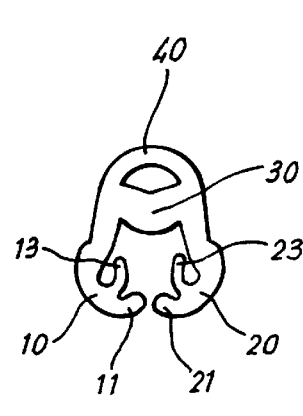

FIGS. 4, 5 and 6 illustrate variations of a third embodiment in which the limb members 10, 20 are provided with resilient biasing members 13, 23 each in the form of relatively thin, resilient limbs extending inwardly from the limbs 10 from a position rearwards of the bit 30. These are adapted to press against the upper jaw or mandible of the animal to which the device is fitted. A further variation, (not shown) includes a further member joining the ends of the biasing members 13, 23 as shown in FIGS. 4 and 6.

Figure 7:
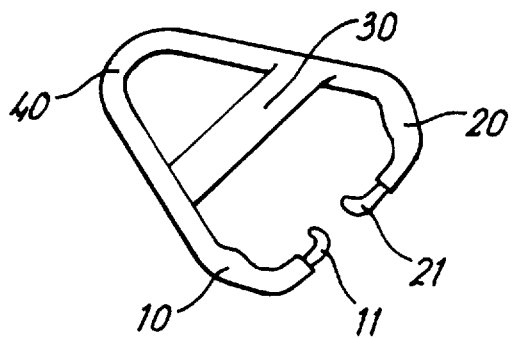
FIG. 7 is a perspective view of the embodiment of FIG. 1.

FIG. 7 shows a perspective view of the device of FIG. 1.

Figure 8:
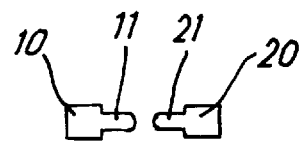
FIG. 8 is an end view of the embodiment of FIG. 1.

FIG. 8 is an end view of the embodiment of FIG. 1, in which, for clarity, the bit member 30 and guard member 40 are not shown. Here it can clearly be seen that the end portions 11, 21 have smaller cross sectional area than the remainder of the limb members 10, 20.

Figure 9:
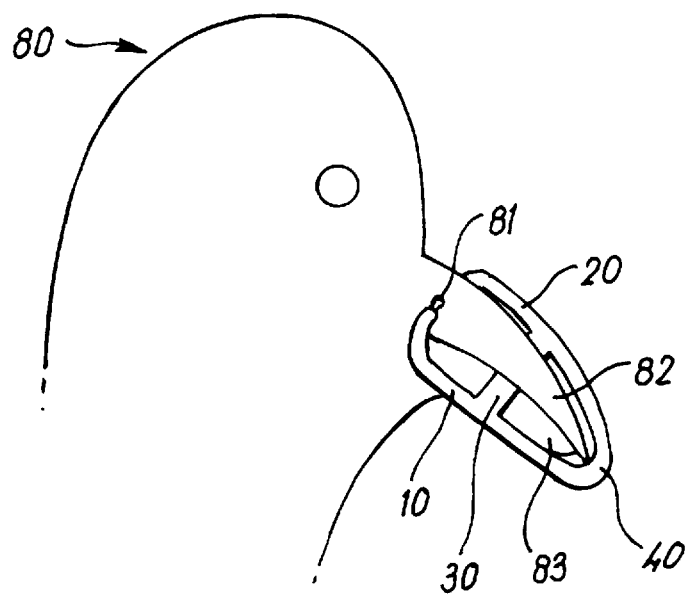
FIG. 9 is an illustration of a device in use.

FIG. 9 illustrates the embodiment of FIG. 1 fitted to a bird.

In use, for example on a bird 80 as illustrated in FIG. 9, the narrowed end portions 11, 21 of the limb member 10, 20 are located in the nostrils 81 of the bird. The bit member 30 is located between the upper 82 and lower 83 mandibles of the bird 80 and the guard member 40 extends just beyond the tip of the upper mandible 82. The bird is thus effectively prevented from pecking other birds.

The location of the end portions 11, 21 in the nostrils is quite loose, although the predetermined spacing between the end portions 11, 21 is made small enough to prevent either of these portions from being inadvertently removed from the nostrils. Because of this looseness of fit the device may, under some circumstances, be able to pivot about these portions 11, 21.

The embodiment of FIGS. 4 to 6 is designed in order to prevent such pivoting. The illustrated devices have biasing members 13, 23 extending from the limb members 10,20, which, in use, exert a force upon the upper mandible of the bird, thus keeping the bit member in contact with the upper mandible and preventing pivoting of the device. The biasing members 13, 23 of this embodiment are projections with smaller cross sectional area than the limb members 10, 20 and may be easily produced by one of a number of known plastics moulding processes which may be used to produce the device as a whole.

The embodiment of FIG. 3, in use, works in a similar way to the embodiment of FIGS. 1 and 2 except that because the bit member 30 is the only coupling between the limb members 10, 20 the device breaks into two separate pieces when the bit member 30 breaks. The end portions 11, 21 in the nostrils are therefore completely disconnected from each other and the two halves of the device quickly become detached from the bird. Thus by selecting the strength and durability of the bit member the approximate length of time for which the device will remain attached to the bird may be determined.

Devices with limited lifetimes are desirable under some circumstances because, for example, the aggressive tendencies of birds tend to diminish as the birds reach maturity, and where the devices are no longer required their manual removal would be a time consuming activity. In such an embodiment the limb members 10, 20 and guard members 40A, 40B may be substantially rigid, with the required resilience of the device being provided by the bit member 30. Embodiments of this type may also incorporate biasing members 13, 23 as shown in FIGS. 4, 5 and 6. A split guard of this type makes it easier for an animal to extricate itself if the guard becomes entangled in foliage or the like.

FIGS. 10 to 13 illustrate a number of other embodiments of the invention.

Figure 10:
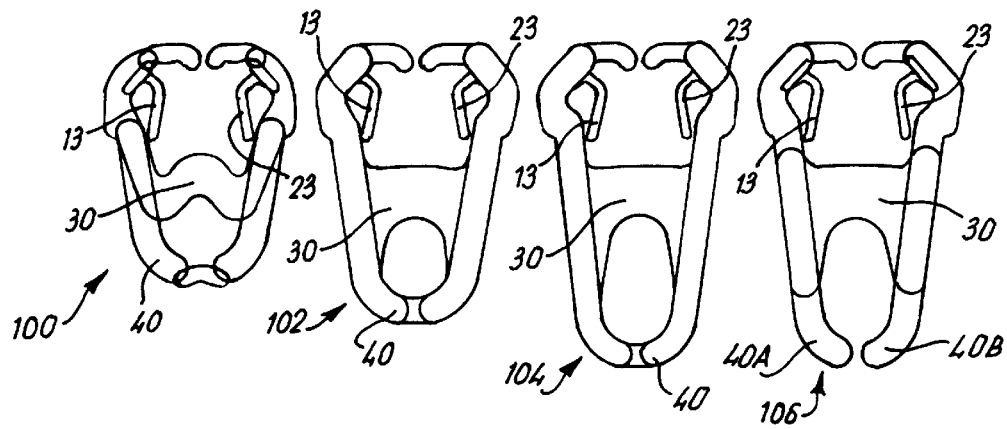
FIGS. 10, 11 and 12 show plan views of further embodiments of the invention.

In FIG. 10 there is shown an embodiment 100 suitable for hens, particularly hens at point of lay, which includes resilient bias members 13, 23 and a bit 30 which is configured to maintain the alignment of the device with the beak tip. This embodiment would suitably be 25 mm in length. Also shown are further embodiments 102, 104 and 106, suitable for game birds. These also include resilient bias elements 13, 23, and have bits 30 which are generally planar and have a relatively large surface area. Embodiments 102 and 104 are identical except for their length (30 mm and 35 mm respectively, to suit different sizes of gird). Embodiment 106 is substantially identical to 104 except that it has a split guard member 40A/40B. In embodiments 100–104, the forward ends of the guards 40 are reduced in cross section to facilitate drinking.

Figure 11:
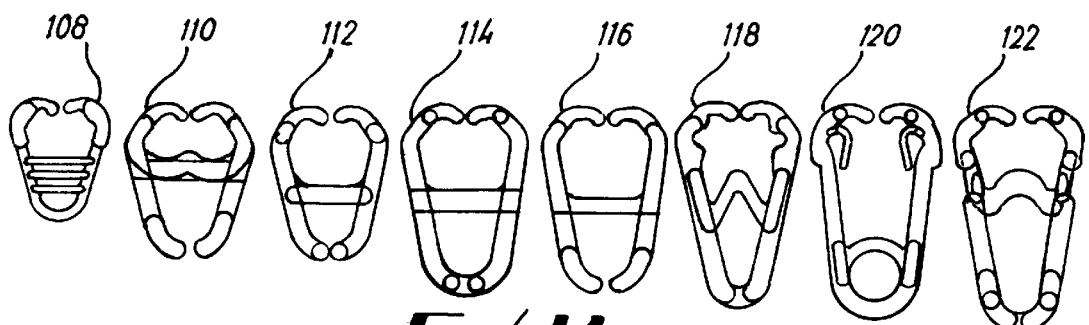

FIG. 11 shows further variants 108–122, which vary in size and configuration to suit different sizes and species of bird. The configuration of the bit 30 in particular may vary to suit different beak and tongue types. Guards 40 may be split or may include reduced cross-section portions as in embodiments 100–104, and the devices may include resilient bias members 13, 23 as required. Embodiment 108 shows the use of multiple, relatively thin bit members 30 (three in this example), arranged in spaced parallel series along the length of the device. These would be bitten through successively as the bird grows in size.

Figure 12:
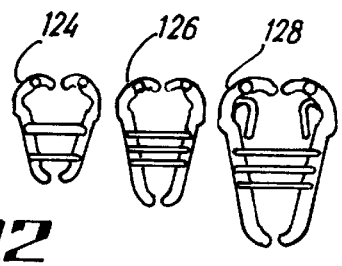

FIG. 12 shows further embodiments 124–128 having multiple bit members 30 and having split guards 40. Embodiment 128 also includes resilient bias members 13, 23.

Figure 13:
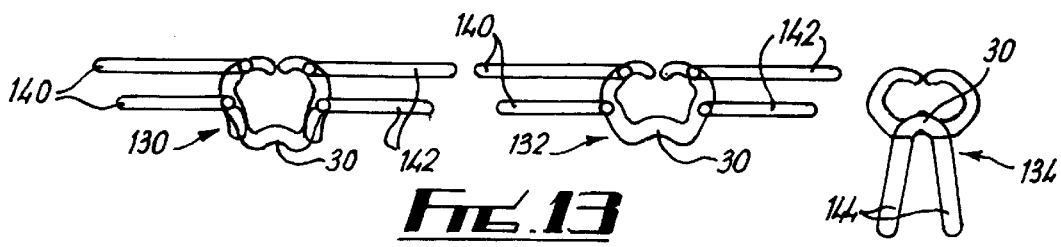
FIG. 13 shows plan views of still further embodiments of the invention.

FIG. 13 shows alternative embodiments 130–134. In embodiments 130 and 132, the guards comprise first and second pairs of parallel limbs 140, 142 extending laterally outwards from the sides of the device. In embodiment 134, the guard comprises first and second diverging limbs 144 projecting forwardly from the bit 30. These embodiments are intended particularly for use with restrictively fed broiler breeder hens. The guard configuration restricts access to feed areas. The configuration of the bits 30 may be varied to allow for more or less beak opening.

All of the embodiments described and illustrated herein may be moulded from suitable plastics materials in one piece. All of the parts of each embodiment lie in substantially the same plane to facilitate stacking of a plurality of similar devices. Where parts of the devices extend out of said plane to a significant extent, such parts may be configured so as to be capable of nesting with adjacent devices in a stack.

The embodiments illustrated have several advantages over prior art devices. Their generally planar form makes them convenient to stack and fit into cartridges or magazines, so that they may be effectively used with automated fitting machines, such as that described in PCT application No. WO 91/13726. Such automated fitting, or indeed manual fitting, would consist of forcing the end portions 11, 21 of the limb members 10, 20 away from each other in order to locate them in the nostrils and then releasing them, allowing the resilience of the device to reduce the gap between them. The equilibrium spacing between the end portions is determined at the time of manufacture of the device, according to circumstances in which the device will be used.

Improvements and modifications may be incorporated without departing from the scope of the invention.

What is claimed is:

1. An anti-pecking device for fitting to a beak of a bird, comprising first and second limb members each having an end portion adapted to be located in a nostril of the bird, at least one bit member coupled to at least one of said limb members and adapted to be positioned between the jaws or mandibles of the bird and at least one guard member coupled to at least one of said limb members adapted to extend outwardly from the jaws or mandible of the, and wherein said limb members, bit member and at least one guard member all extend in substantially a single plane, and said limb members extend in a forward direction from said end portions such that, in use of the device, with said end portions located in the nostrils of the bird, said limb members are located one on either side of the beak of the bird and said bit member interconnects said limb members, extending between upper and lower portions of said beak.

2. An anti-pecking device as claimed in claim 1, wherein said at least one guard member extends forwardly of the jaws or mandible of the bird.

3. An anti-pecking device as claimed in claim 1, wherein at least first and second guard members extend laterally on either side of the jaws or mandible of the bird.

4. An anti-pecking device as claimed in claim 1, wherein the end portions of said limb members, which are adapted to be located in the nostrils of the bird, are spaced apart from each other.

5. An anti-pecking device as claimed in claim 4, wherein the device is configured so that said end portions may be resiliently forced away from each other, increasing the distance by which they are spaced apart.

6. An anti-pecking device as claimed in claim 5, wherein, said limb members are formed from a resilient material.

7. An anti-pecking device as claimed in claim 1, wherein one or both of the bit member and guard member connect said first and second limb members.

8. An anti-pecking device as claimed in claim 1, wherein there is provided bias means to bias the bit member against the upper jaw or mandible of the bird.

9. An anti-pecking device as claimed in claim 8, wherein said bias means comprises at least one bias member adapted to press down upon an upper surface of the upper jaw or mandible of the bird.

10. An anti-pecking device as claimed in claim 9, wherein at least one of the first and second limb members is provided with at least one bias member.

11. An anti-pecking device as claimed in claim 10, wherein both the first and second limb members are provided with a bias member.

12. An anti-pecking device as claimed in claim 11, wherein said bias members extend inwardly from said limbs from a position rearwards of said bit member.

13. An anti-pecking device as claimed in claim 7, wherein said bit member provides the only connection between the first and second limb members, and said bit member is adapted to be broken following a period of use.

14. An anti-pecking device as claimed in claim 1, wherein the device is configured such that a plurality of such devices may be nested or stacked upon one another.

15. An anti-pecking device as claimed in claim 1, wherein said device is substantially planar.

16. An anti-pecking device as claimed in claim 1, wherein said device is formed from a single piece of a plastics material.

17. An anti-pecking device as claimed in claim 1, including a plurality of bit members arranged in spaced, parallel series along the length of the device.

* * * * *

UNITED STATES PATENT AND TRADEMARK OFFICE
CERTIFICATE OF CORRECTION

PATENT NO. : 5,836,267
DATED : November 17, 1998
INVENTOR(S) : Eadie et al.

It is certified that error appears in the above-identified patent and that said Letters Patent is hereby corrected as shown below:

ON THE TITLE PAGE:

[56] References Cited

The following references should be added:

U.S. PATENT DOCUMENTS

| | | | |
|---|---|---|---|
| 1,877,897 | 9/32 | Kosten et al. | |
| 3,807,360 | 4/74 | Keene | 119/97 |

FOREIGN PATENT DOCUMENTS

| | | |
|---|---|---|
| 2705527 | 12/94 | France |
| 2561069 | 09/85 | France |

UNITED STATES PATENT AND TRADEMARK OFFICE
CERTIFICATE OF CORRECTION

PATENT NO. : 5,836,267
DATED : November 17, 1998
INVENTOR(S) : Eadie et al.

It is certified that error appears in the above-identified patent and that said Letters Patent is hereby corrected as shown below:

Col 5, Line 4: should read --
outwardly from the jaws or mandible of the bird, and wherein --.

Signed and Sealed this

Twentieth Day of April, 1999

Attest:

Q. TODD DICKINSON

*Attesting Officer*  *Acting Commissioner of Patents and Trademarks*